Figure 1:
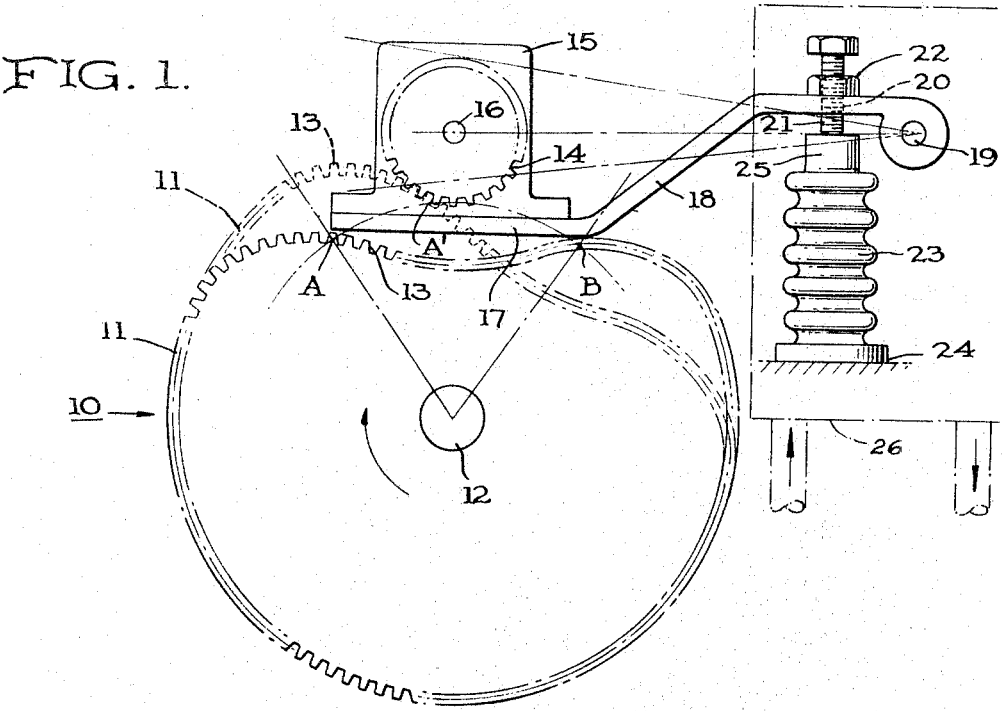

Aug. 8, 1967  W. E. ROSE  3,334,519

TEMPERATURE COMPENSATING DEVICE FOR FLUID METERS

Filed Oct. 7, 1964

INVENTOR
WILLIS E. ROSE
BY
Cameron, Kerkam & Sutton
ATTORNEYS

United States Patent Office 3,334,519
Patented Aug. 8, 1967

3,334,519
TEMPERATURE COMPENSATING DEVICE FOR FLUID METERS
Willis E. Rose, Connersville, Ind., assignor to Dresser Industries Inc., Dallas, Tex., a corporation of Delaware
Filed Oct. 7, 1964, Ser. No. 402,261
7 Claims. (Cl. 73—233)

The present invention relates to compensating devices for fluid meters, and more particularly to a device for correcting the indicated volume reading of a positive displacement fluid meter so as to compensate for variations in temperature of the metered fluid.

In fluid meters of the type commonly utilized for the volumetric measurement of gaseous fluids, such as gas meters, the density of the gas, and hence its heating value per unit of volume, varies with changes of temperature of the gas. Consequently, the volume of gas passing through the meter, as recorded on an indicator driven directly by the meter, does not accurately indicate what the volume would measure at the standard temperature used for computing the cost of the gas used. Variations in gas density due to temperature changes thus result in under-registration of the meter at low temperature and over-registration at high temperatures. It is therefore necessary, particularly in the case of large gas-using installations, to provide means for compensating for the effect of temperature variations.

Various devices have been proposed for correcting the readings of gas meters so as to compensate for variations in the temperature of the metered gas. However, in known prior art arrangements such compensation is usually accomplished by the use of a variable ratio friction drive provided in the transmission to the counting mechanism of the meter and arranged to be controlled by the changes in length of a temperature sensitive element exposed to the gas to be measured. Fluid meter compensating devices of this type suffer from the disadvantage that they require a complex mechanical arrangement which necessitates accurately machined parts and frequent maintenance and calibration to prevent loss of reliability after a relatively short period of working time.

These and other disadvantages of prior art compensating devices are overcome by the present invention which provides a volume correcting mechanism for fluid meters which comprises a simple and reliable means for so controlling the drive of the counter index by the meter that the volumetric displacement of the meter is corrected for variations in temperature of the gas from a standard base temperature.

Accordingly, the primarly object of the present invention is to provide a new and improved mechanical compensating device for positive displacement fluid meters which will automatically compensate for variations in temperature of the metered fluid, and will cause the meter to register accurately the volume of the fluid used with reference to a predetermined standard or base temperature.

Another object is to provide a reliable device for correcting the index readings of a fixed displacement gas meter which is self-contained on the meter and follows temperature variations automatically to provide an accurate measurement of the gas flow in terms of a standard volume-temperature relationship.

To this end, there is provided a novel drive mechanism which varies the effective driving relationship between the output element of the meter and the input element of the counter in response to variations in temperature of the gas. According to the invention, the counter is supported on a movable arm actuated by a temperature sensitive element subject to the temperature of the metered gas, whereby the counter is displaced relative to the meter housing in proportion to temperature variations of the metered gas so as to vary the effective engagement between a constant radius counter driving gear and a varying radius meter driven cam gear. The cam gear is so shaped that the counter index registers at a faster or a slower rate, relative to the meter displacement rate, depending upon the position of the counter, and thus causes the counter to register accurately the volume of fluid used in terms of the standard base temperature.

Figure 2:
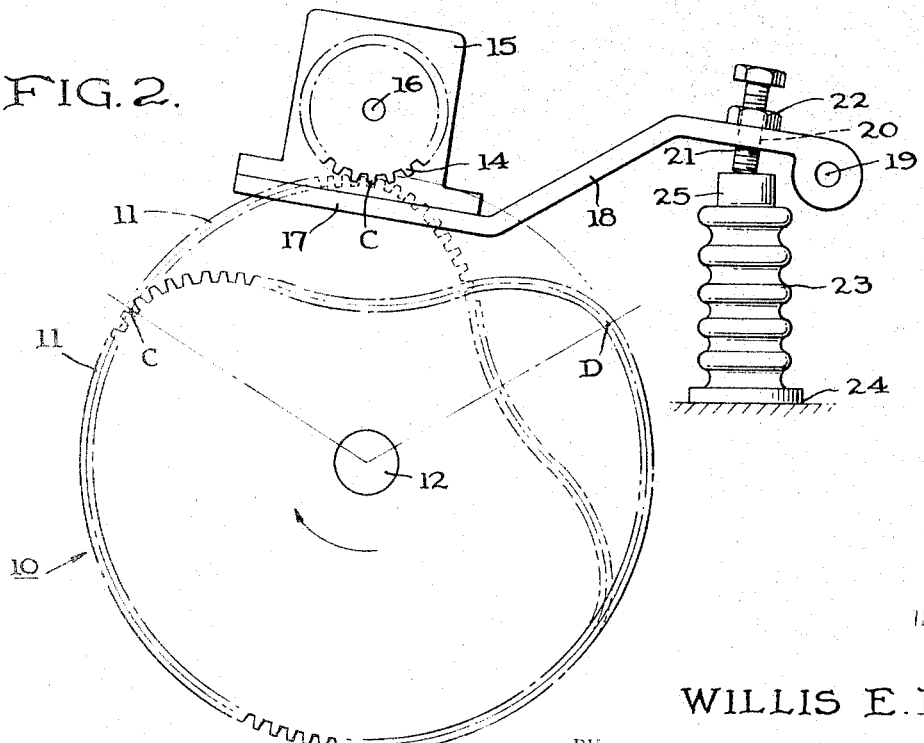

Other features of the invention will appear from the following description of the exemplary mechanical embodiment thereof which is illustrated in the accompanying drawing, wherein like reference characters indicate like parts throughout the several views, and:

FIG. 1 is a fragmentary, somewhat diagrammatic elevational view of one form of temperature compensating device for a gas meter embodying the present invention, the counter being shown in the position which it occupies when the temperature of the meter gas is substantially equal to the standard base temperature; and FIG. 2 is another view of the embodiment of FIG. 1 showing the positions of the elements when the temperature of the gas is higher than the standard base temperature.

Referring now to the drawing, the numeral 10 designates generally a compensating or correcting device embodying the invention which is adapted to be a self-contianed part of a conventional gas meter of the rotary positive displacement type (not shown). As illustrated, the device 10 includes a varying radius disc or cam gear 11 mounted on a rotatable shaft 12 which is adapted to be driven by the output element of the meter in any suitable manner so that its rotational movement is a direct measure of the volume of gas passing through the meter. Cam gear 11 is provided on its periphery with spur-type gear teeth 13 adapted for cooperative engagement with a spur-type gear 14 of uniform radius which is mounted on the input shaft 16 of a counter 15 of conventional type.

The axis of rotation of the counter driving cam gear 11 and shaft 12 is fixed, but that of driven gear 14 and shaft 16, while fixed relative to the counter 15, is movable in a vertical or radial direction relative to cam gear 11 and shaft 12. In the embodiment shown, the counter 15 is supported on a substantially horizontal platform 17 formed at one end of a movable arm 18 which is fulcrumed at its other end of a fixed pivot 19 for oscillation in a vertical plane. Intermediate its ends, arm 18 is provided with a threaded hole 20 within which is supported an adjusting screw 21 adapted to be locked in its adjusted position by means of a locking nut 22, for a purpose hereinafter described.

To control the effective engagement between the driven gear 14 and the driving cam gear 11, the supporting platform 17 and counter 15 are arranged to be displaced vertically in response to variations in the temperature of the metered gas. To effect this displacement, there is provided a suitable temperature sensitive element which, in the example illustrated, is an expansible-contractible, sealed bellows 23 of known form rigidly supported at its lower end 24. The upper end of the bellows is free for vertical movement and has mounted thereon a stop 25 which is adapted to engage the lower end of the adjusting screw 21. Bellows 23 has sealed within it a suitable temperature sensitive fluid, which may be a sample of the gas passing through the meter, and is so positioned as to be exposed to the temperature of the metered gas. For example, the bellows 23 and a portion of the movable arm 18 with its associated adjusting screw and nut 21 and 22 may be enclosed within a chamber 26, indicated by phantom lines in FIGURE 1. This chamber would be sealed from other portions of the meter which house the cam gear 11 and counter 15 for example; and the chamber would be arranged so that the gas passing through the meter and being measured would flow through the chamber. The chamber 26 may be provided with a suitable opening and flexible seal where the arm 18 passes through the chamber wall. A showing of the chamber 26 is omitted from FIGURE 2. The construction of the bellows is such that its length varies proportionally to changes in the volume of the contained gas which in turn varies with the temperature to which the bellows is subjected. Accordingly, expansion or contraction of the bellows 23 in response to variations in the temperature of the metered gas results in a vertical movement of stop 25 and a corresponding displacement of the platform 17 and counter 15.

In operation, the tip of screw 21 is set to engage the stop 25 so that the movable arm 18 supports the platform 17 and counter 15 in the intermediate, substantially horizontal position shown in FIG. 1 when the bellows 23 is exposed to an ambient temperature equal to the standard base temperature at which consumption of the metered gas is computed, e.g., 60° F. In this position, the counter driving gear 14 is maintained out of engagement with that segment of the gear teeth 13 of cam gear 11 between points A and B. As the cam gear 11 rotates, due to the passage of gas through the meter, the gear teeth at point A will be advanced in a clockwise direction until they engage the teeth of gear 14 at point A'. The gear 14 and cam gear 11 are then maintained in engagement by gravity until the cam gear 11 has been rotated sufficiently that the gear teeth originally at point B approach point A, at which time the cam gear 11 and driven gear 14 are again disengaged. Thus, at the standard base temperature, for each revolution of the meter driven shaft 12, the gears 11 and 14 are in engagement for less than a full revolution of the cam gear 11 and the effective engagement is defined by the segment of the cam gear extending counterclockwise from point A to point B. Engagement and disengagement of the gears upon what is, in effect, a radial movement of the teeth of gear 11 relative to those of gear 14 is facilitated by the use of straight spur-type teeth on both gears.

Any change in temperature of the metered gas from the standard base temperature will be reflected by a corresponding change in the length of the bellows 23. This in turn results in displacement of the counter 15 from the intermediate position shown in FIG. 1 so as to vary the extent of engagement between the cam gear 11 and counter gear 14. As indicated in FIG. 2, an increase in temperature of the metered gas causes the bellows 23 to expand forcing stop 25 upwardly against the tip of adjusting screw 21. The upward movement of stop 25 raises arm 18 about pivot 19 so as to displace counter 15 and gear 14 away from cam gear 11. On the other hand, a decrease in temperature of the metered gas causes bellows 23 to contract, lowering stop 25 and dropping counter 15 and gear 14 under the influence of either gravity or a biasing spring. Since the change in length of bellows 23 can be accurately calibrated for any given temperature variation, the displacement of counter 15 and gear 14 can be so determined as to maintain effective engagement between cam gear 11 and counter gear 14 in accordance with temperature variations.

For an increase in temperature of the metered gas above the standard base temperature, counter gear 14 is displaced upwardly from the position shown in FIG. 1, and therefore engages cam gear 11 over a lesser portion of the latter's circumference, which results in driving of the counter index register at a lower rate than the gas meter displacement rate. For a decrease in temperature of the metered gas with respect to the standard base temperature, an opposite effect is exerted on the compensating device, in that bellows 23 contracts and causes arm 18 to swing downwardly about its pivot 19. The counter 15 and gear 14 are thus moved closer to the axis of cam gear 11 so that the gears remain in engagement over a greater portion of the circumference of cam gear 11, including at least part of the segment between points A and B, in which case the counter index register is driven at a faster rate relative to the meter displacement rate.

The shape of cam gear 11 is so designed that, when the counter 15 is in the position shown in FIG. 1, i.e., when the metered gas is at the standard base temperature, the counter will register the actual volume of gas displaced through the meter. For example, assuming that the standard base temperature is 60° F. (520° R.), the length of the segment of cam gear 11 between points A and B, measured counterclockwise, which will be in contact with gear 14, defines the extent of effective engagement for the intermediate temperature, and provides a 1–1 ratio between the volume of gas displaced through the meter and the indicated reading of the counter. For temperatures above and below the intermediate temperature, the portion of the circumference of cam gear 11 in effective engagement with counter gear 14 is less and greater, respectively, than counterclockwise segment A–B. In the example given, if the maximum expected temperature of the metered gas is 120° F. (580° R.), the circumferential length of the cam gear segment engaging the counter gear 14 at that temperature (counterclockwise segment C–D in FIG. 2), would be 520/580, or 89.66%, of the length of the segment A–B corresponding to the standard base temperature. Also, if the minimum expected temperature of the gas is —40° F. (420° R.), at which time the counter gear 14 remains in engagement with the entire circumference of cam gear 11, the length of the complete circumference of said gear would be 520/420, or 123.8%, of the length of segment A–B.

There is thus provided by the present invention a novel, structurally simple mechanism for correcting the counter reading of a positive displacement gas meter so as to compensate for variations in temperature of the metered gas with respect to a standard base temperature. Although only one particular embodiment of the invention has been described and illustrated in the accompanying drawing, it will be obvious to those skilled in the art that the inventive concept is capable of a variety of mechanical modifications. It is therefore intended by the appended claims to cover all such modifications which fall within the true scope of the invention.

What is claimed is:

1. A device for correcting the reading of a fluid meter to compensate for variations in temperature of the metered fluid from a standard base temperature, comprising a varying radius cam gear rotatably driven by the meter, a rotatable index counter for registering the volume of fluid passing through the meter having a counter driving gear adapted to be driven by said cam gear when in engagement with the latter, means supporting said counter and counter driving gear for movement relative to said cam gear whereby said driving gear moves in the plane of said cam gear, and means responsive to variations in the temperature of the metered fluid for moving said counter relative to said cam gear to vary the effective engagement between said cam gear and said counter driving gear.

2. A device for correcting the reading of a fluid meter to compensate for variations in temperature of the metered fluid from a standard base temperature, comprising a varying radius cam gear having peripheral teeth rotatably driven by the meter, a rotatable index counter for registering the volume of fluid passing through the meter having a counter driving gear with peripheral teeth adapted to be driven by said cam gear when in engagement with the latter, a movable member supporting said counter for movement relative to said cam gear and insert whereby said driving gear moves in the plane of said cam gear, and a temperature sensitive device subject to the temperature of the metered fluid for displacing said member to vary the effective engagement between said cam gear and said counter driving gear.

3. A temperature compensated device for registering the volume of gas passing through a positive displacement gas meter, comprising a counter having a driving gear rotatable in a vertical plane, a cam gear of non-uniform radius mounted on a fixed axis and rotatably driven by the meter in the same vertical plane as that of said counter driving gear, means supporting said counter above and for vertical movement relative to the axis of said cam gear, whereby said counter driving gear may come into engagement with said cam gear as the latter rotates, movable stop means for limiting the downward movement of said counter toward the axis of said cam gear, and means responsive to variations in the temperature of the metered gas for varying the position of said stop means and thereby varying the peripheral extent of said cam gear which comes into driving engagement with said counter driving gear.

4. A temperature compensated device for registering the volume of gas passing through a positive displacement gas meter, comprising a counter having a driving gear rotatable in a vertical plane, a cam gear of non-uniform radius mounted on a fixed axis and rotatably driven by the meter in the same vertical plane as that of said counter driving gear, a movable member supporting said counter above and for vertical movement relative to the axis of said cam gear, whereby said counter driving gear may come into engagement with said cam gear as the latter rotates, said movable member supporting said counter in an intermediate position such that said counter driving gear and said cam gear are in engagement for less than a full revolution of the latter when the temperature of the metered gas is equal to a predetermined standard base temperature, and a temperature sensitive device subject to the temperature of the metered gas operable to move said arm and displace said counter from its intermediate position in response to variations in temperature of the metered gas from said predetermined standard base temperature, and to thereby control the duration of driving engagement between said cam gear and said counter driving gear during each revolution of said cam gear.

5. A temperature compensated device as claimed in claim 4 wherein said temperature sensitive device is so constructed and arranged that it displaces the counter upwardly with respect to said cam gear and thereby decreases the duration of engagement between said cam gear and said counter driving gear when the temperature of the metered fluid rises above said predetermined standard base temperature, and lowers the position of said counter so as to increase the duration of engagement between said gears when the temperature of the metered fluid falls below said predetermined standard base temperature.

6. A temperature compensated device for registering the volume of gas passing through a positive displacement gas meter, comprising a counter having a driving gear rotatable in a vertical plane, a cam gear of non-uniform radius mounted on a fixed axis and rotatably driven by the meter in the same vertical plane as that of said counter driving gear, a member pivotally supported on a fixed horizontal axis supporting said counter above and for vertical movement relative to the axis of said cam gear, whereby said counter driving gear may come into engagement with said cam gear as the latter rotates, movable stop means for limiting the downward movement of said supporting member and said counter toward the axis of said cam gear, said stop means being so positioned when the temperature of the metered gas is equal to a predetermined standard base temperature that said counter driving gear and said cam gear are in engagement for less than a full revolution of the latter, and means responsive to variations in the temperature of the metered gas from said predetermined standard base temperature for varying the position of said stop means and thereby varying the peripheral extent of said cam gear which comes into driving engagement with said counter driving gear during each revolution of the former.

7. A temperature compensated device as defined in claim 6 including means for adjusting the position of said counter supporting member relative to said stop means when said supporting member has reached the limit of its downward movement permitted by said stop means.

References Cited

FOREIGN PATENTS 539,903   11/1931   Germany.

RICHARD C. QUEISSER, *Primary Examiner.*

E. D. GILHOOLY, *Assistant Examiner.*